(12) United States Patent
Guminy et al.

(10) Patent No.: US 9,674,060 B2
(45) Date of Patent: Jun. 6, 2017

(54) DYNAMIC AND SELECTIVE MANAGEMENT OF INTEGRATION POINTS USING PERFORMANCE METRICS

(71) Applicant: International Business Machines Corporation, Armonk, NY (US)

(72) Inventors: Scott M. Guminy, Newmarket (CA); Leho Nigul, Richmond Hill (CA); Kevin Yu, Unionville (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 833 days.

(21) Appl. No.: 14/046,359

(22) Filed: Oct. 4, 2013

(65) Prior Publication Data
US 2014/0101309 A1   Apr. 10, 2014

(30) Foreign Application Priority Data
Oct. 5, 2012 (CA) ..................... 2791771

(51) Int. Cl.
*G06F 15/173* (2006.01)
*H04L 12/26* (2006.01)
(Continued)

(52) U.S. Cl.
CPC ........ *H04L 43/0811* (2013.01); *G06F 11/349* (2013.01); *H04L 41/5096* (2013.01);
(Continued)

(58) Field of Classification Search
CPC .................................................. H04L 43/0817
(Continued)

(56) References Cited

U.S. PATENT DOCUMENTS

| 5,913,061 A | 6/1999 | Gupta et al. |
| 6,256,676 B1 | 7/2001 | Taylor et al. |
| (Continued) | | |

FOREIGN PATENT DOCUMENTS

| CN | 1620781 A | 5/2005 |
| CN | 102460391 A | 5/2012 |
| CN | 1685330 A | 10/2016 |

OTHER PUBLICATIONS

Oracle White Paper; "Guide to Implementing Application Integration Architecture on Oracle Service Bus"; Oracle; p. 1-114; Mar. 2011.

*Primary Examiner* — David Lazaro
*Assistant Examiner* — Marie Georges Henry
(74) *Attorney, Agent, or Firm* — Cantor Colburn LLP; Rahan Uddin

(57) ABSTRACT

In one embodiment, a computer-implemented method for dynamic management of integration points includes connecting a set of applications to a communication interconnect fabric to form a set of connections, wherein each application in the set of applications is interconnected and each individual connection has a set of integration paths defined including a default path. The set of connections is monitored to determine whether a performance metric for a specific application in the set of applications is within a predefined tolerance. Responsive to a determination that the performance metric for the specific application in the set of applications is not within a predefined tolerance, a change may be instructed in availability of an integration component.

14 Claims, 7 Drawing Sheets

(51) Int. Cl.
*H04L 12/24* (2006.01)
*G06F 11/34* (2006.01)
*G06F 9/50* (2006.01)

(52) U.S. Cl.
CPC ........ *H04L 43/0817* (2013.01); *G06F 9/5083* (2013.01); *G06F 11/3433* (2013.01)

(58) Field of Classification Search
USPC .................................. 709/224, 223; 711/100
See application file for complete search history.

(56) References Cited

U.S. PATENT DOCUMENTS

| | | | | |
|---|---|---|---|---|
| 6,871,324 | B2* | 3/2005 | Hand | H04L 41/046 709/223 |
| 7,383,355 | B1 | 6/2008 | Berkman et al. | |
| 7,546,606 | B2 | 6/2009 | Upton | |
| 7,827,256 | B2* | 11/2010 | Phillips | G06F 8/67 709/220 |
| 7,903,571 | B1 | 3/2011 | Herington | |
| 2003/0120502 | A1 | 6/2003 | Robb et al. | |
| 2004/0103193 | A1 | 5/2004 | Pandya et al. | |
| 2007/0074225 | A1* | 3/2007 | Viertola | G06F 9/546 719/313 |
| 2008/0039042 | A1* | 2/2008 | Ciccarelli | H04B 1/109 455/234.1 |
| 2009/0106480 | A1* | 4/2009 | Chung | G06F 12/0866 711/100 |
| 2013/0275585 | A1* | 10/2013 | Santhanakrishnan | G06F 11/3476 709/224 |

* cited by examiner

DYNAMIC AND SELECTIVE MANAGEMENT OF INTEGRATION POINTS USING PERFORMANCE METRICS

PRIORITY

This application claims priority to Canadian Patent Application No. 2791771, filed Oct. 5, 2012, and all the benefits accruing therefrom under 35 U.S.C. §119, the contents of which in its entirety are herein incorporated by reference.

BACKGROUND

This disclosure relates generally to component integration in a data processing system and, more specifically, to dynamic and selective management of integration points using performance metrics in the data processing system.

Applications or application components often communicate to other applications or components to retrieve and process associated data forming an integration point. For example, an electronic commerce application communicating with a search appliance to retrieve catalog search data forms an integration point, and the electronic commerce application communicates with an order management system to store orders from another integration point because each pair of components is configured to work together.

Granular, interconnected services are becoming more common with software as a service (SaaS), also referred to as software on demand. Using this delivery model, software and associated data are centrally hosted on a cloud-computing environment. Granular, interconnected services also result from deployment of applications using cloud computing.

When using these support and delivery models, overall performance of such a resulting integrated system is often only as strong as the weakest link. Typically the weakest link in the system is outside control of the owner of the software or application. For example, a performance issue may be located in a non-performing third-party application or in a slow network component.

SUMMARY

In one embodiment, a computer-implemented method for dynamic management of integration points includes connecting a set of applications to a communication interconnect fabric to form a set of connections, wherein each application in the set of applications is interconnected and each individual connection has a set of integration paths defined including a default path. The set of connections is monitored to determine whether a performance metric for a specific application in the set of applications is within a predefined tolerance. Responsive to a determination that the performance metric for the specific application in the set of applications is not within a predefined tolerance, a change may be instructed in availability of an integration component.

In another embodiment, a computer program product includes a computer readable storage medium having computer readable program code embodied thereon. The computer readable program code is executable by a processor to perform a method for dynamic management of integration points. The method includes connecting a set of applications to a communication interconnect fabric to form a set of connections, wherein each application in the set of applications is interconnected and each individual connection has a set of integration paths defined including a default path. Further according to the method, the set of connections is monitored to determine whether a performance metric for a specific application in the set of applications is within a predefined tolerance. Responsive to a determination that the performance metric for the specific application in the set of applications is not within a predefined tolerance, a change may be instructed in availability of an integration component.

In yet another embodiment, an apparatus for dynamic management of integration points includes a processing unit. The processing unit is configured to connect a set of applications to a communication interconnect fabric to form a set of connections, where each application in the set of applications is interconnected and each individual connection has a set of integration paths defined including a default path; monitor the set of connections; and determine whether a performance metric for a specific application in the set of applications is within a predefined tolerance. Responsive to a determination that the performance metric for the specific application in the set of applications is not within a predefined tolerance, the processing unit is further configured to instruct a change in availability of an integration component.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
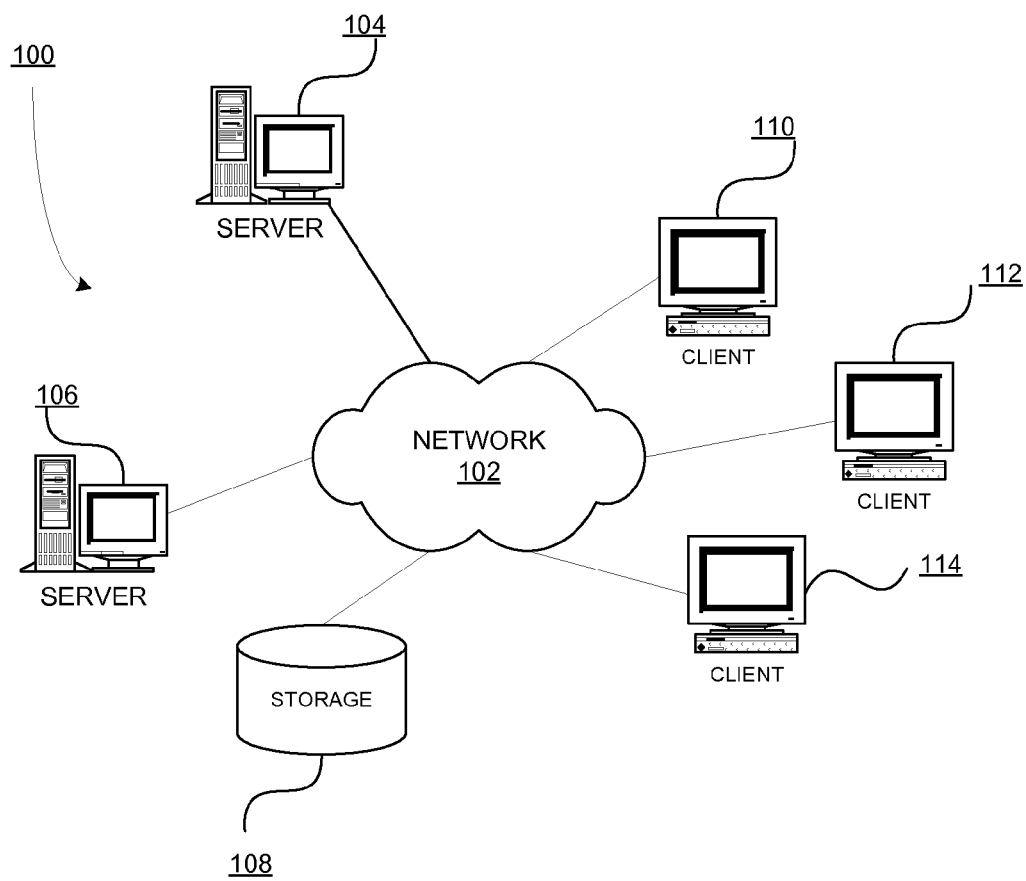
FIG. 1 is a block diagram of an exemplary network data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable data storage medium(s) may be utilized. A computer-readable data storage medium may be, for example, but not limited to, an electronic, magnetic, optical, or semiconductor system, apparatus, or device, or any suitable combination of the foregoing. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing. In the context of this document, a computer-readable data storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented method such that the instructions which execute on the computer or other programmable apparatus provide processes for implementing the functions/acts specified in the flowchart and/or block diagram block or blocks.

Figure 2:
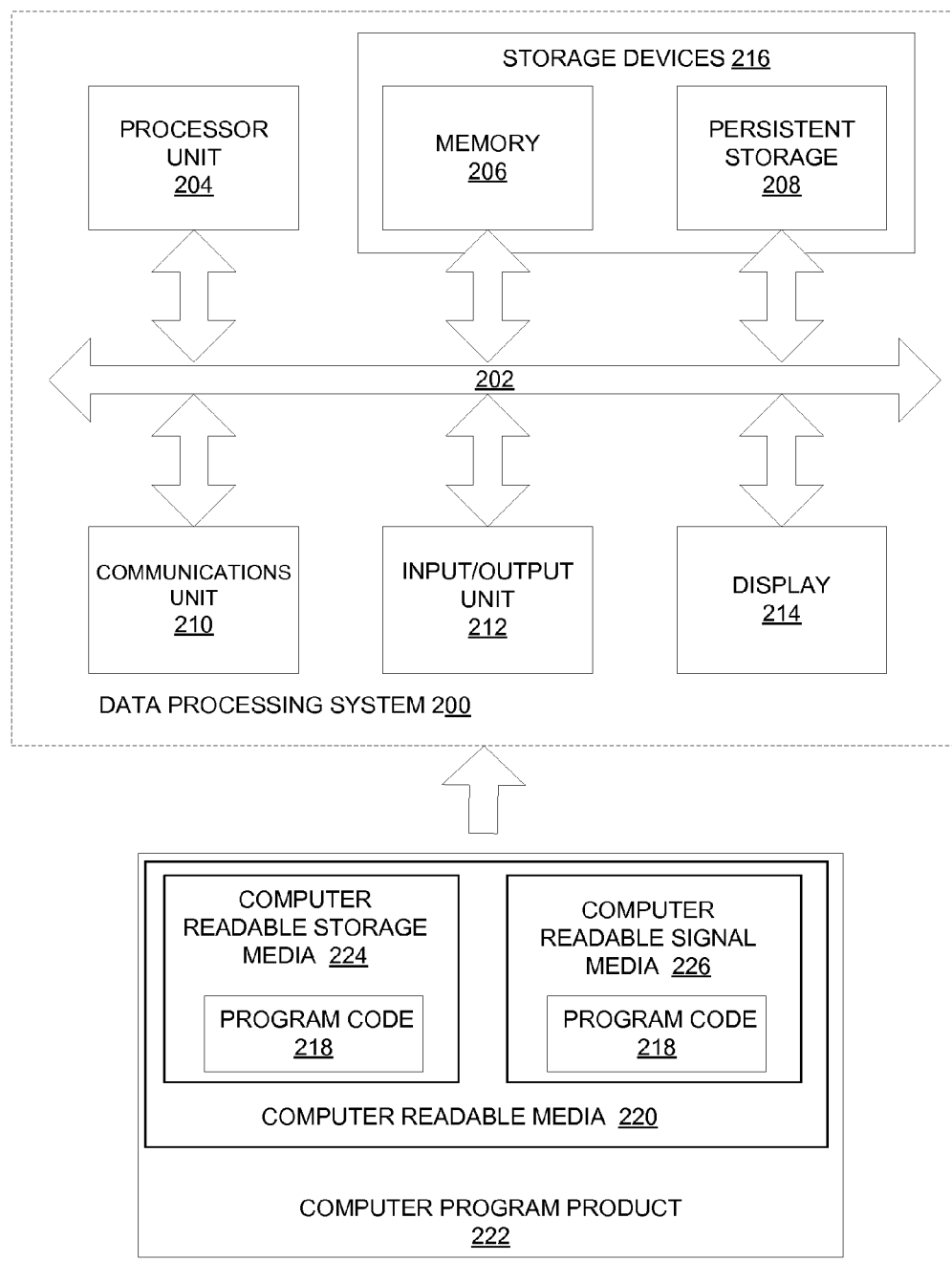
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a representation of a network of data processing systems in which illustrative embodiments of dynamic and selective management of integration points using performance metrics may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections such as, for example, wired, wireless communication links, fiber optic cables, or a combination thereof.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications, to clients 110, 112, and 114. Clients 110, 112, and 114 are clients to server 104 in this example. Network data processing system 100 may include additional servers, clients, or other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Network data processing system 100 alternatively may be implemented as one or more different types of networks, such as, for example, an intranet, a local area network (LAN), or a wide area network (WAN). FIG. 1 is intended as an example, and not as an architectural limitation for the different illustrative embodiments.

Embodiments of the disclosed method may programmatically enable and disable selected integration components, responsive to predefined performance metrics. An embodiment of the disclosed method defines a single point of configuration and quality management for inter-application and inter-component requests. The embodiment also provides a common view into available integration interfaces and enables definition of relationships between functionality of the integration interfaces and performance metrics. For example, using an embodiment, a business user may be enabled to define a rule specifying when integration with Component A on a web site becomes too slow (defined as, for example, average response time being higher that 1 second) at certain critical moments. In that case, the Component A integration functionality may be suspended and not retried for a specified time period, for example, 30 minutes. The service may thus be unavailable during the specified time period.

With reference to FIG. 2, a block diagram of an exemplary data processing system operable for various embodiments of the disclosed dynamic and selective management of integration points using performance metrics is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device may be a piece of hardware capable of storing information, such as, for example, data, program code in functional form, or other suitable information either on a temporary basis or permanent basis. Memory 206 may be, for example, a random access memory or other suitable volatile or non-volatile storage device. Persistent storage 208 may take various forms depending on the particular implementation, and may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210 may provide for communications with other data processing systems or devices. In the example, communications unit 210 is a network interface card. Communications unit 210 may provide communications through the use of either or both physical and wireless communications links.

Input/output unit 212 allows for data input from and output to other devices that may be connected to data processing system 200. For example, input/output unit 212 may provide a connection for user input through a keyboard, a mouse, or some other suitable input device. Further, input/output unit 212 may send output to a printer. Display 214 may provide a mechanism to display information to a user.

Instructions for the operating system, applications, and programs may be located in storage devices 216, which may be in communication with processor unit 204 through communications fabric 202. In this illustrative example, the instructions are in a functional form on persistent storage 208. These instructions may be loaded into memory 206 for execution by processor unit 204. The operations of the different embodiments may be performed by processor unit 204 using computer-implemented instructions, which may be located in a memory, such as memory 206.

These instructions are referred to as program code, computer usable program code, or computer readable program code that may be read and executed by a processor, such as processor unit 204. The program code in the different embodiments may be embodied on different physical or tangible computer readable storage media, such as memory 206 or persistent storage 208.

Program code 218 may be located in a functional form on computer readable storage media 220 that is selectively removable and may be loaded onto or transferred to data processing system 200 for execution by processor unit 204. Program code 218 and computer readable storage media 220 form computer program product 222 in this example. Computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. In some instances, computer readable storage media 220 may not be removable.

In some cases, program code 218 may be transferred to data processing system 200 from computer readable storage media 220 through a communications link to communications unit 210 or through a connection to input/output unit 212. The communications link or connection may be wired or wireless in this example. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented method for dynamic management of integration points is presented. Processor unit 204 may connect a set of applications to a communication interconnect fabric to form a set of connections, wherein each application in the set of applications is interconnected and each individual connection has a set of integration paths defined, including a default path. Processor unit 204 may monitor the set of connections to determine whether a performance metric for a specific application in the set of applications is within a predefined tolerance. Responsive to a determination that the performance metric for the specific application in the set of applications is not within a predefined tolerance, processor unit 204 may instruct a change in availability of a particular integration component.

Figure 3:
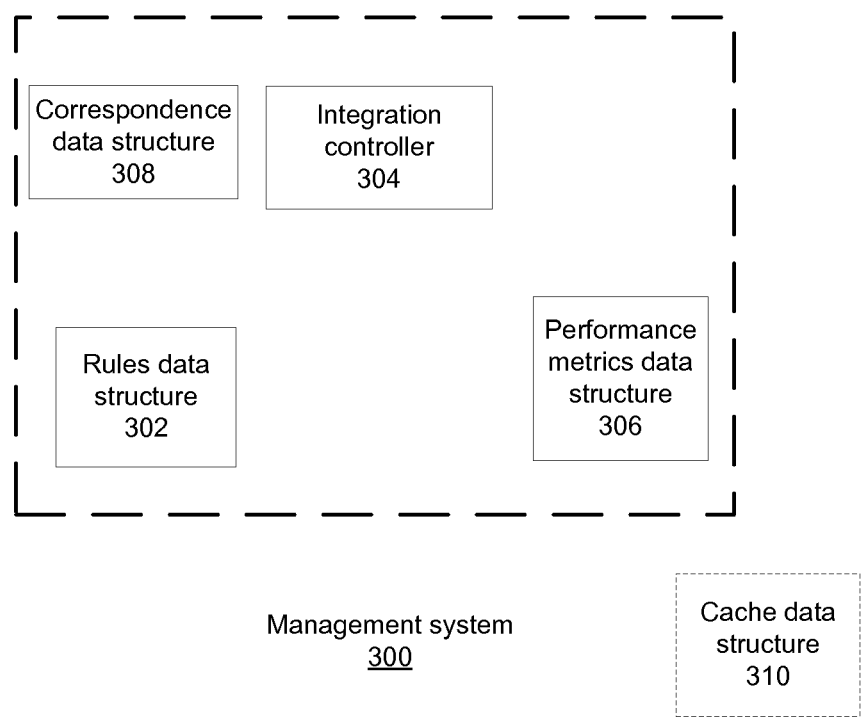
FIG. 3 is a block diagram of components of a management system operable for various embodiments of the disclosure.

With reference to FIG. 3, a block diagram of a management system operable for various embodiments of the disclosure is presented. Management system 300 is an example of a set of components for dynamic and selective management of integration points using performance metrics of the disclosure.

Management system 300 comprises a number of components leveraging support of an underlying data processing system, for example, network data processing system 100 of FIG. 1 and data processing system 200 of FIG. 2. Management system 300 may include functional components, including rules data structure 302, integration controller 304, performance metrics data structure 306, correspondence data structure 308, and cache data structure 310.

Rules data structure 302 may behave as a configurable repository that stores existing rules and enables business and technical users to add and customize rules on an as-needed basis. For example, a user can specify a rule to instruct a system to shut down a specific integration component when a response time (of an applicable component) exceeds a specified threshold for a predefined time duration. Rules data structure 302 may be accessed and managed using an interface such as an editor or other user interface. An example of a rule structure is provided in FIG. 5.

Integration controller 304 may monitor a set of connections, wherein the integration controller uses a set of selectable rules maintained in a repository of performance-metric-driven rules of rules data structure 302 and measurement plugins used to populate performance metrics data structure 306. Integration controller 304 may include a set of soft switches, wherein a soft switch is a logical element configured to enable or disable a connection between component pairs defining an integration point responsive to execution of an associated rule of rules data structure 302. Integration controller 304 may be configured to enable and disable integration links under programmatic control.

Integration controller 304 need not correct or analyze a problem using a performance observation; however the controller can stop and start a predefined link when a predetermined threshold is reached. Integration controller 304 may accordingly respond to values identified in performance metrics data structure 306, as defined in conditions identified using rules of rules data structure 302.

Performance metrics data structure 306 may store measurement values associated with a number of predetermined component metrics representative of performance of a respective component. Performance metrics data structure 306 may determine an action for a specified component without having to incur overhead of determining a status of the specified component each time a status is used. For example, a response time measurement value associated with a network component may be saved as a performance metric for the specific network component in performance metrics data structure 306.

Performance metrics data structure 306 may provide a pluggable performance monitoring capability as a set of selectable, pluggable, and customizable components for measuring the values of metrics defined in rules data structure 302. A rule in rules data structure 302 may reference the metric during rules processing and use the saved value rather than interrogating the network component directly.

Correspondence data structure 308 may link performance metrics, including service definitions and quality of service for requests an application needs to process, to specific protocols and integration channels used to integrate the application with other components of a system. A relative importance value may be assigned as an attribute to each integration component based on performance metrics.

Optional cache data structure 310 may store data received through integration points. The existence of cached data, for example inventory information obtained from integration with a third party inventory system, may enable use of a rule defined to pick data from cache, rather than requiring use of a real time integration request.

Figure 4:
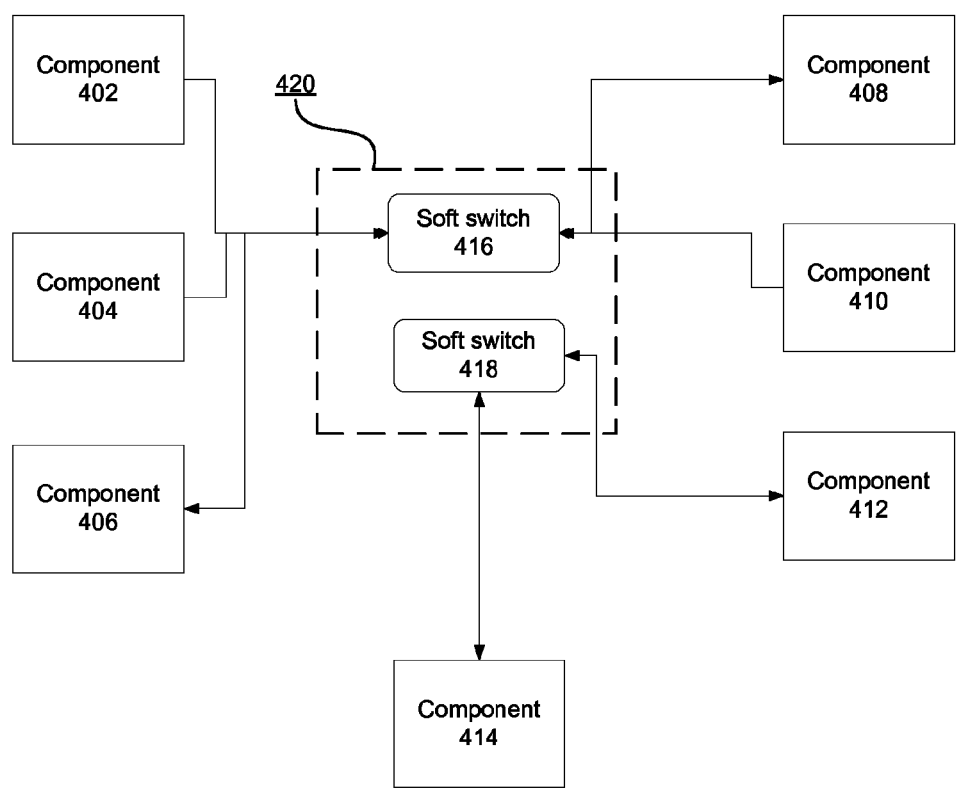
FIG. 4 is a block diagram of relationships among components of the management system of FIG. 3 operable for various embodiments of the disclosure.

With reference to FIG. 4, a block diagram of component relations in the management system 300 of FIG. 3, operable for various embodiments of the disclosure, is presented. Management system 400 is an example of a set of components for dynamic and selective management of integration points using performance metrics of management system 300 of FIG. 3.

In the example of management system 400, component 402 through component 412 communicate through a communication fabric containing integration controller 420 to form defined pairs of integration points. The defined pairs of integration points may be defined in relationships, such as a one to one, one to many, and a many to one relationships.

For example, component 402, component 404, and component 406 may communicate with component 408 and component 410, to define a portion of set of integration points. Component 414 may be paired with component 412 to form another integration point.

Integration controller 420 may contain soft switch 416 and soft switch 418 to control communication links for the defined integration points. Soft switch 416 may be under programmatic control to enable or disable communication links connecting component 402, component 404, and component 406 with respect to component 408 and component 410. In a similar manner, soft switch 418 may be under programmatic control to enable or disable communication links connecting component 414 with component 412.

The soft switch elements of integration controller 420 may be functional logical elements typically implemented in software as needed. An analogy for the soft switch of integration controller 420 is a circuit breaker, because once a predefined condition is reached, an action is performed affecting an associated pair of components. For example, the action specified may disconnect a specified component for a predetermined time period and may additionally specify a number of retries before stopping completely. In addition, as part of the rules framework, a policy for restoring the integration component may be specified using a time-based rule, such as "retry after 30 minutes" or using a predefined value, for example, "retry after requests per hour metric is less than 10,000."

Management system 400 may reduce complexity of component logic from the logic of an integration point. For example, using the system may enable a predefined rule expressed as "when average response time for the integration Point A takes more than 1 sec, stop sending requests to Point A for 30 minutes," where Point A can be a previously defined integration point, to exercise control in a programmatic manner. The system may therefore be responsive to a measurable condition of a rule being determined and a corresponding action taken. Embodiments of the disclosed system can be implemented, for example, as part of an on-premise software product or part of a cloud-based deployment without loss of functionality.

Figure 5:
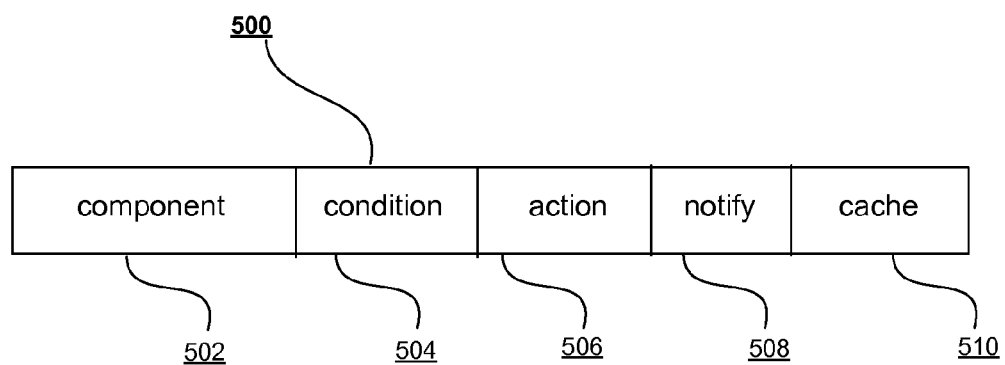
FIG. 5 is a block diagram of a rule construct used in a management system operable for various embodiments of the disclosure.

With reference to FIG. 5, a block diagram of a rule construct used in a management system operable for various embodiments of the disclosure is presented. Rule construct 500 is an example of a rule format as used within a set of rules for dynamic and selective management of integration points using performance metrics of management system 300 of FIG. 3.

Rule construct 500 comprises a number of elements including component 502, condition 504, action 506, notify 508 and cache 510. Each element of a rule may define a portion of an executable rule responsive to the performance metrics as defined in management system 300 of FIG. 3. An element may be an explicit value associated with a parameter or may be optionally used with a default value.

Component 502 may identify the application or application component that is the focus of a particular rule statement and is affected during processing of the applicable rule. The identified application or application component may be identified from a set of integration points in which pairs of applications or application components are identified using correspondence data structure 308 of management system 300 of FIG. 3. For example, using a pair of Application A and Application B, forming integration points defined in the correspondence table, enables use of either A or B or a combination of A and B in a rule definition.

Component or application component refers to an identifiable unit (logical, physical, or a combination) that represents a measurable and managed portion of a data processing system. For example, a component can specify a disk drive or a collection of disk drives, a subsystem, or a portion of an application such as a payment-processing portion or a communication interface. The components and associated relationships may be identified using correspondence data structure 308 of management system 300 of FIG. 3.

Condition 504 may provide a capability to define an expression in the form of a combination of portions, including a performance metric, an operator and a value. The condition identifies a test to be evaluated before a corresponding action is taken. For example, a performance metric such as "average response time" (associated with the a named component in the statement) may be provided in a first portion of the condition element. A second portion may state a specific arithmetic operator, for example "greater than" to indicate a specification of limit or threshold. And a third portion may specify a value, which may be a simple numeric with implied units (for example, 15) or a combination of a numeric value and units stated (for example, 5 seconds). The condition may be evaluated to determine an outcome of true or false.

Action 506 may provide a capability to specifically identify what processing is to occur as a consequence of determining a condition to be one of true or false. For example, when the condition evaluates to true, a sequence of instructions may be performed causing the named component to have communications suspended for a predetermined time period, and after the predetermined time period, a retry operation mat be performed to establish communications. The sequence may be repeated when defined as a repeating sequence for a predetermined number of repetitions. When the condition evaluates to false, no action is taken in the given example.

Notify 508 may be an optional element enabling notification of an identified application, application component, or user upon evaluating a condition as true. Notification may therefore be used to trigger another operation in another component or simply to inform or to log an occurrence of the condition.

Cache 510 is an optional element enabling use of cache data rather than interrogating a component during resolution of the condition. For example, when cache is enabled, evaluation of a particular rule may use cache data obtained prior to processing of the rule. Use of cache may therefore avoid repeated interrogation of a related component and associated overhead. Cache data may be accumulated asynchronously to the operation of the management system by well-known methods to populate a cache data structure for identified components in subsequent use. Caching may also permit methods to be used to collect information for components, which may not have the capability to respond to a real time query for performance metric information.

When cache is disabled, a performance metric for a specified component may be obtained in real time for evaluation (real time in relation to a rule being processed). Caching may be typically enabled.

Figure 6:
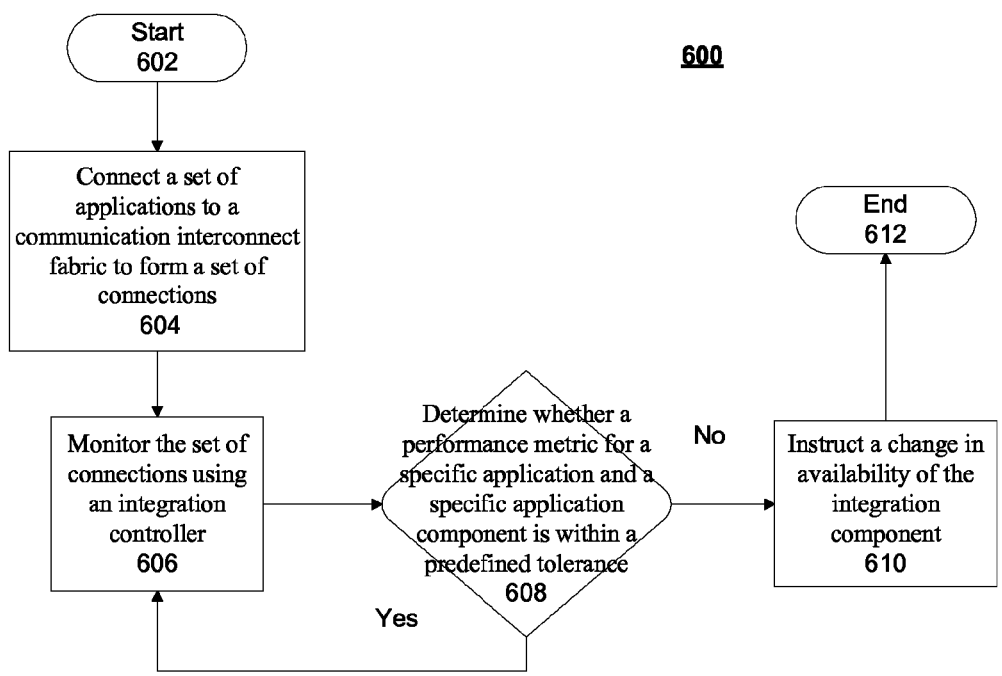
FIG. 6 is a flow chart of a high-level view of a method using the management system operable for various embodiments of the disclosure.

With reference to FIG. 6, a flow chart of a high-level view of a method 600 using a management system operable for various embodiments of the disclosure is presented. Method 600 is a high level example of a method using the set of rules for dynamic and selective management of integration points using performance metrics of management system 300 of FIG. 3.

Method 600 begins (block 602) and connects a set of applications (including associated application components) to a communication interconnect fabric to form a set of connections (block 604). The applications, including the application components, may be interconnected and each individual connection may have a set of integration paths defined including a default path. The integration paths may be defined and managed in correspondence data structure 308 of management system 300 of FIG. 3.

Method 600 monitors the set of connections using an integration controller (block 606). The integration controller may use a set of selectable rules maintained in a repository of performance metric driven rules and measurement plugins to determine when a predefined action involving one or more of the applications, including the application components, is required to be performed. Method 600 determines whether a performance metric for a specific application or a specific application component is within a predefined tolerance (block 608). Monitoring may determine whether a predefined condition for a particular combination of components forming an integration point is reached.

According to method 600, responsive to a determination that a performance metric for a specific application or a specific application component is not within (i.e., exceeds) a predefined tolerance of a particular rule, the integration controller instructs a change in availability of the integration component (block 610) and terminates thereafter (block 612). The change in availability may cause an associated state change to occur in the specific application. The associated state change may remain in effect for a predetermined time period (as indicated in the applicable rule) until the integration controller restores the original state (as defined in the applicable rule). For example, a rule may state "when component A has an average response time greater than 1 second" (the condition), then "disable communication" (the action), "restore after 30 seconds" (the predetermined period of time), "notify operator" (notification is enabled and directed to the operator), and "cache enable (cache usage is enabled and directed to the cached data associated with the component). If the condition is evaluated to be true, the communication link for the component may be disabled, but the link may be enabled after 30 seconds and subsequently evaluated.

Figure 7:
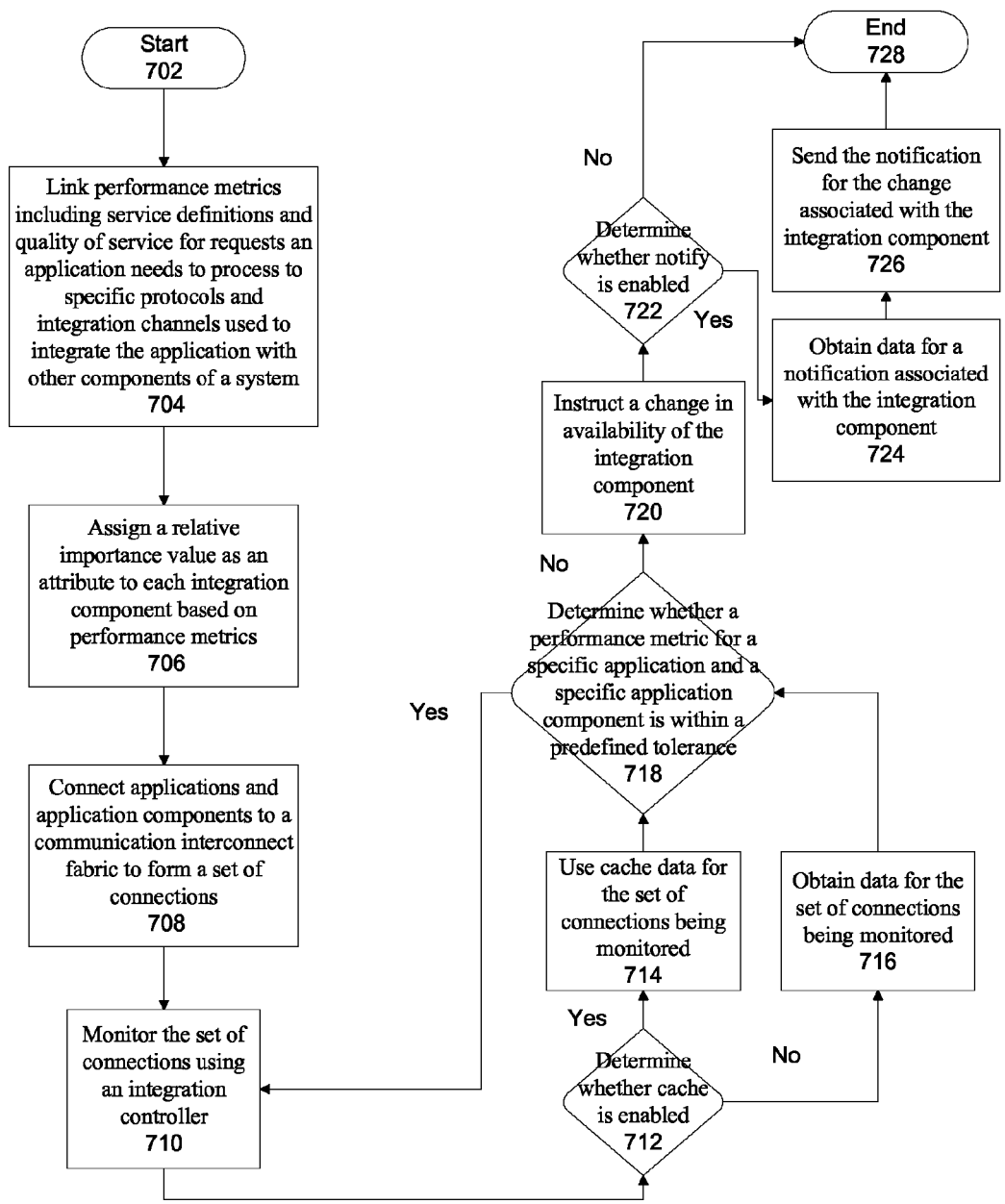
FIG. 7 is a flow chart of a detail view of a method using the management system operable for various embodiments of the disclosure.

With reference to FIG. 7, a flow chart of a detail-view of a method 700 using the management system operable for various embodiments of the disclosure is presented. Method 700 is a detailed example of a method using the set of rules for dynamic and selective management of integration points using performance metrics of management system 300 of FIG. 3.

Method 700 begins (block 702) and links performance metrics, including service definitions and quality of service for requests an application needs to process, to specific protocols and integration channels used to integrate the application with other components of a system (block 704). The linkage may be defined using a data structure such as correspondence data structure 308 of management system 300 of FIG. 3. The links defined therein may provide pairs of applications forming integration points.

Method 700 assigns a relative importance value as an attribute to each integration component based on performance metrics (block 706). The relative importance provides a capability to manage the application according to importance ranking. For example, when the performance metric is not within a predefined tolerance, a further determination using the relative importance value may enable more precision proportional to the relative importance in initiating a change to the application.

Method 700 connects applications and application components to a communication interconnect fabric to form a set of connections (block 708). Each of the applications and the application components may be interconnected, and each individual connection may have a set of integration paths defined including a default path. Method 700 monitors the set of connections using an integration controller (block 710). The integration controller may use a set of selectable rules maintained in a repository of performance metric driven rules and measurement plugins such as rules data structure 302 and performance metrics data structure 306 of management system 300 of FIG. 3.

Method 700 determines whether a cache is enabled (block 712). Cache data may or may not be used in association with a specific set of integration paths. Responsive to a determination that cache is enabled, method 700 uses cache data for the set of connections being monitored (block 714). Responsive to a determination that cache is not enabled, method 700 obtains data for the set of connections being monitored (block 716). Obtaining data may require interrogating a component to retrieve current status and performance metric information representative of the particular component associated with the set of connections being monitored.

Method 700 determines whether a performance metric for a specific application and a specific application component is within a predefined tolerance (block 718). Responsive to a determination that a performance metric for a specific application and a specific application component is within a predefined tolerance, method 700 loops back to perform block 710 as before. Responsive to a determination that a performance metric for a specific application and a specific application component is not within a predefined tolerance, method 700, using the integration controller, instructs a change in availability of the particular integration component (block 720). Instructing a change in availability of the particular integration component may cause a state change to occur in the particular component. The state change may remain for a predetermined time period until an original state is again restored using the integration controller.

Method 700 determines whether notify is enabled (block 722). Responsive to a determination that notify is not enabled, method 700 terminates (block 728). Responsive to a determination that notify is enabled, method 700 obtains data for a notification associated with the component of the integration point (block 724). Method 700 sends the notification associated with the change involving the integration component (block 726) and terminates thereafter (block 728).

Thus is presented an illustrative embodiment of a computer-implemented method for dynamic management of integration points, where that method connects a set of applications to a communication interconnect fabric to form a set of connections, wherein each application in the set of applications is interconnected and each individual connection has a set of integration paths defined including a default path. The set of connections may be monitored to determine whether a performance metric for a specific application in the set of applications is within a predefined tolerance. Responsive to a determination that the performance metric for the specific application in the set of applications is not within a predefined tolerance, the computer-implemented method may instruct a change in availability of a particular integration component.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage medium having computer executable instructions stored thereon in a variety of forms. Examples of computer readable data storage media include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented method for dynamic management of integration points, the computer-implemented method comprising:
   connecting a set of applications to a communication interconnect fabric to form a set of connections, wherein each application in the set of applications is interconnected and each individual connection has a set of integration paths defined including a default path;
   adding a first rule to a rule repository, wherein the first rule is user-defined, and wherein the rule repository comprises a plurality of rules defining management of the set of applications;
   monitoring the set of connections of the communication interconnect fabric to determine whether a performance metric for a specific application in the set of applications is within a predefined tolerance associated with the first rule in the rule repository; and
   responsive to a determination that the performance metric for the specific applications in the set of applications connected through the communication interconnect fabric, is not within the predefined tolerance, instructing a change in availability of an integration component;
   wherein the integration component is associated with the specific application and is integrated with the communication interconnect fabric;
   wherein the change in availability of the integration component causes a state change of the specific application, and wherein the state change remains effective for a time period that is based on the first rule.

2. The computer-implemented method of claim 1, wherein connecting the set of applications to the communication interconnect fabric to form a set of connections comprises:
   linking performance metrics, including one or more service definitions and a quality of service for requests each application needs to process, to one or more protocols and integration channels used to integrate the specific application with other components of a system, wherein a linkage is defined using a correspondence data structure, and wherein the links defined therein provide one or more pairs of applications forming integration points; and
   assigning a relative importance value as an attribute to the integration component using the performance metrics.

3. The computer-implemented method of claim 1, wherein monitoring the set of connections comprises:
   determining whether cache is enabled;
   responsive to a determination that cache is enabled, using cache data for the set of connections being monitored; and
   responsive to a determination that cache is not enabled, obtaining data for the set of connections being monitored.

4. The computer-implemented method of claim 3, wherein obtaining data for the set of connections being monitored comprises:
   obtaining data in real time by interrogating the integration component to retrieve current status and performance metric information representative of the integration component associated with the set of connections being monitored.

5. The computer-implemented method of claim 1, wherein instructing a change in availability of the integration component comprises:
   determining whether notify is enabled;
   responsive to a determination that notify is enabled, obtaining data for notification associated with the integration component; and
   sending the notification for the change associated with the integration component.

6. A computer program product comprising a non-transitory computer readable storage medium having computer readable program code embodied thereon, the computer readable program code executable by a processor to perform a method for dynamic management of integration points, the method comprising:
   connecting a set of applications to a communication interconnect fabric to form a set of connections, wherein each application in the set of applications is interconnected and each individual connection has a set of integration paths defined including a default path;
   adding a first rule to a rule repository, wherein the first rule is user-defined, and wherein the rule repository comprises a plurality of rules defining management of the set of applications;
   monitoring the set of connections of the communication interconnect fabric to determine whether a performance metric for a specific application in the set of applications is within a predefined tolerance associated with the first rule in the rule repository; and
   responsive to a determination that the performance metric for the specific applications in the set of applications connected through the communication interconnect fabric, is not within the predefined tolerance, instructing a change in availability of an integration component;

wherein the integration component is associated with the specific application and is integrated with the communication interconnect fabric;

wherein the change in availability of the integration component causes a state change of the specific application, and wherein the state change remains effective for a time period that is based on the first rule.

7. The computer program product of claim 6, wherein connecting the set of applications to the communication interconnect fabric to form a set of connections comprises:

linking performance metrics, including one or more service definitions and a quality of service for requests each application needs to process, to one or more protocols and integration channels used to integrate the specific application with other components of a system, wherein a linkage is defined using a correspondence data structure, and wherein the links defined therein provide one or more pairs of applications forming integration points; and assigning a relative importance value as an attribute to the integration component using the performance metrics.

8. The computer program product of claim 6, wherein monitoring the set of connections comprises:

determining whether cache is enabled;

responsive to a determination that cache is enabled, using cache data for the set of connections being monitored; and responsive to a determination that cache is not enabled, obtaining data for the set of connections being monitored.

9. The computer program product of claim 8, wherein obtaining data for the set of connections being monitored comprises:

obtaining data in real time by interrogating the integration component to retrieve current status and performance metric information representative of the integration component associated with the set of connections being monitored.

10. The computer program product of claim 6, wherein instructing a change in availability of the integration component comprises:

determining whether notify is enabled;

responsive to a determination that notify is enabled, obtaining data for notification associated with the integration component; and sending the notification for the change associated with the integration component.

11. An apparatus for dynamic management of integration points, the apparatus comprising:

a memory, and a computer processing device coupled with the memory and configured to: connect a set of applications to a communication interconnect fabric to form a set of connections, wherein each application in the set of applications is interconnected and each individual connection has a set of integration paths defined including a default path;

add a first rule to a rule repository, wherein the first rule is user-defined, and wherein the rule repository comprises a plurality of rules defining management of the set of applications;

monitor the set of connections of the communication interconnect fabric to determine whether a performance metric for a specific application in the set of applications is within a predefined tolerance associated with the first rule in the rule repository; and responsive to a determination that the performance metric for the specific applications in the set of applications connected through the communication interconnect fabric, is not within the predefined tolerance, instruct a change in availability of an integration component;

wherein the integration component is associated with the specific application and is integrated with the communication interconnect fabric;

wherein the change in availability of the integration component causes a state change of the specific application, and wherein the state change remains effective for a time period that is based on the first rule.

12. The apparatus of claim 11, the computer processing device being further configured, in connecting the set of applications to the communication interconnect fabric to form a set of connections, to:

link performance metrics, including one or more service definitions and a quality of service for requests each application needs to process, to one or more protocols and integration channels used to integrate the specific application with other components of a system, wherein a linkage is defined using a correspondence data structure, and wherein the links defined therein provide one or more pairs of applications forming integration points; and assign a relative importance value as an attribute to the integration component using the performance metrics.

13. The apparatus of claim 11, the computer processing device being further configured, in monitoring the set of connections, to:

determine whether cache is enabled;

responsive to a determination that cache is enabled, use cache data for the set of connections being monitored; and responsive to a determination that cache is not enabled, obtain data for the set of connections being monitored.

14. The apparatus of claim 11, the computer processing device being further configured, in instructing a change in availability of the integration component, to: determine whether notify is enabled; responsive to a determination that notify is enabled, obtain data for notification associated with the integration component; and send the notification for the change associated with the integration component.

* * * * *